United States Patent
Kwak et al.

(10) Patent No.: US 8,673,486 B2
(45) Date of Patent: Mar. 18, 2014

(54) BATTERY PACK INCLUDING COVER CASE COVERING, HOLDER CASE AND PROTECTION CIRCUIT MODULE

(75) Inventors: Eunok Kwak, Yongin-si (KR); Seok Koh, Yongin-si (KR); Youngho Kim, Yongin-si (KR); Kyungho Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 348 days.

(21) Appl. No.: 13/051,127

(22) Filed: Mar. 18, 2011

(65) Prior Publication Data

US 2012/0045666 A1    Feb. 23, 2012

(30) Foreign Application Priority Data

Aug. 23, 2010  (KR) .................... 10-2010-0081588

(51) Int. Cl.
| | |
|---|---|
| *H01M 2/02* | (2006.01) |
| *H01M 2/06* | (2006.01) |
| *H01M 2/08* | (2006.01) |
| *H01M 10/48* | (2006.01) |

(52) U.S. Cl.
USPC .............. 429/177; 429/93; 429/163; 429/180

(58) Field of Classification Search
USPC ................................ 429/7, 93, 163, 177, 180
See application file for complete search history.

(56) References Cited

U.S. PATENT DOCUMENTS

| 2007/0026302 A1 | 2/2007 | Yoon |
| 2009/0092891 A1 | 4/2009 | Kwag et al. |
| 2009/0092896 A1* | 4/2009 | Koh et al. ..................... 429/163 |
| 2009/0280398 A1 | 11/2009 | Park et al. |

FOREIGN PATENT DOCUMENTS

| JP | 2007157452 | 6/2007 |
| KR | 10-0835743 | 5/2008 |
| KR | 10-2008-0095430 | 10/2008 |
| KR | 10-0876267 | 12/2008 |
| KR | 1020090117315 | 11/2009 |

OTHER PUBLICATIONS

Tononishi, M., Machine translation of JP 2007-157452 A, Jun. 2007.*
Son, C., Machine translation of KR 835743 B1, Jun. 2008.*
Korean Office Action issued on Nov. 24, 2011 in connection with Korean Patent Application Serial No. 10-2010-0081588 and Request for Entry of the Accompanying Office Action attached herewith.

* cited by examiner

*Primary Examiner* — Sean P Cullen
(74) *Attorney, Agent, or Firm* — Robert E. Bushnell, Esq.

(57) ABSTRACT

A battery pack having a holder case capable of preventing short-circuit between a cap plate and an electric terminal, instead of a washer, thereby increasing a coupling force between the holder case and a bare cell while minimizing the volume of the battery pack. The battery pack includes a bare cell including an electrode assembly, a can accommodating the electrode assembly, and a cap assembly for finishing an upper opening of the can, a holder case including a bottom portion covering one side surface of the bare cell, first and second support portions formed at first and second sides of the bottom portion, and an insulating portion fixed while covering a portion of a cap plate forming the cap assembly, a protection circuit module coupled to an upper portion of the holder case, and a cover case fixed to one side surface of the bare cell while covering the holder case and the protection circuit module.

20 Claims, 3 Drawing Sheets

BATTERY PACK INCLUDING COVER CASE COVERING, HOLDER CASE AND PROTECTION CIRCUIT MODULE

CLAIM OF PRIORITY

This application makes reference to, incorporates the same herein, and claims all benefits accruing under 35 U.S.C. §119 from an application earlier filed in the Korean Intellectual Property Office on 23 Aug. 2010 and there duly assigned Ser. No. 10-2010-0081588.

BACKGROUND OF THE INVENTION

1. Field of the Invention

The general inventive concept relates to a battery pack.

2. Description of the Related Art

In general, a battery pack is formed by electrically connecting a bare cell and a protection circuit module to each other. The bare cell is formed by hermetically sealing a can in which an electrode assembly and an electrolyte are accommodated and performs charge and discharge of electricity via chemical reactions.

The above information disclosed in this Related Art section is only for enhancement of understanding of the background of the invention and therefore it may contain information that does not form the prior art that is already known to a person of ordinary skill in the art.

SUMMARY OF THE INVENTION

It is therefore a feature of the present invention to provide a battery pack having a holder case capable of preventing short-circuit between a cap plate and an electric terminal instead of a washer, and a cover case hermetically sealed to a bare cell, thereby increasing a coupling force between the holder case and the bare cell while minimizing the volume of the battery pack.

At least one of the above and other features and advantages may be realized by providing a battery pack including a bare cell including an electrode assembly, a can accommodating the electrode assembly, and a cap assembly for finishing an upper opening of the can, a holder case including a bottom portion covering one side surface of the bare cell, first and second support portions formed at first and second sides of the bottom portion, and an insulating portion fixed while covering a portion of a cap plate forming the cap assembly, a protection circuit module coupled to an upper portion of the holder case, and a cover case fixed to one side surface of the bare cell while covering the holder case and the protection circuit module.

First and second coupling protrusions may be formed in a first support portion of the holder case, and third and fourth coupling protrusions may be formed in a second support portion of the holder case.

First and second fixing protrusions may be formed in the first support portion, and third and fourth fixing protrusions may be formed in the second support portion.

The insulating portion may be formed such that an end thereof reaches one side of an insulation gasket when it is fixed on the cap plate.

A thickness of the insulating portion may be equal to a height ranging from a top surface of the cap plate to a top surface of a negative terminal.

The protection circuit module may include a protection circuit board controlling charging and discharging of a battery, a first lead plate electrically connecting the protection circuit board and the negative terminal, and a second lead plate electrically connecting the protection circuit board and a bottom surface of the can.

The protection circuit board may include first and second fixing grooves at locations corresponding to the first and second fixing protrusions formed in the first support portion, the first and second fixing grooves having sizes and shapes corresponding to those of the first and second fixing protrusions, and third and fourth fixing grooves at locations corresponding to the third and fourth fixing protrusions formed in the second support portion, the third and fourth fixing grooves having sizes and shapes corresponding to those of the third and fourth fixing protrusions.

The first lead plate may be formed such that one side end thereof does not pass of the other side end of the insulation gasket.

The cover case may include a cover portion formed on the protection circuit module and a first fixing portion fixed on the top surface of the bare cell while covering at least a portion of the bare cell.

The cover portion may include a top cover, a first side surface cover formed at one long side of the top cover, a second side surface cover formed at the other long side of the top cover, a third side surface cover formed at one short side of the top cover, and a fourth side surface cover at the other short side of the top cover.

The first side surface cover may include first and second coupling holes at locations corresponding to the first and second coupling protrusions formed in the first support portion, the first and second coupling holes having sizes and shapes corresponding to those of the first and second coupling protrusions, and the second side surface cover may include third and fourth coupling holes at locations corresponding to the third and fourth coupling protrusions formed in the second support portion, the third and fourth coupling holes having sizes and shapes corresponding to those of the third and fourth coupling protrusions.

The first fixing portion may include a first sealing portion forming a space for accommodating the insulating portion and the first lead plate while covering the insulating portion and the first lead plate, and a first adhering portion attached and fixed to the cap plate.

The first sealing portion may have a width corresponding to that of the cap plate and may be positioned lower than the first adhering portion to have a stepped portion with respect to the first adhering portion.

A height of the stepped portion may be equal to the sum of thicknesses of the first lead plate and the first insulating portion.

The boundary where the stepped portion is formed may be positioned at a location corresponding to an end of the other side of the insulation gasket.

The cover case may further includes a second fixing portion fixed on the bottom surface of the bare cell while covering at least a portion of the bottom surface of the bare cell.

The second fixing portion may include a second sealing portion forming a space for accommodating the insulating portion and the second lead plate while covering the insulating portion and the second lead plate, and a second adhering portion attached and fixed to the bottom surface of the can.

The second sealing portion may have a width corresponding to that of the bottom surface of the can and may be formed lower than the second adhering portion to have a stepped portion with respect to the second adhering portion.

A height of the stepped portion may be equal to the thickness of the second lead plate.

The boundary between the second sealing portion and the stepped portion may be positioned at a location corresponding to a corner of the second lead plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
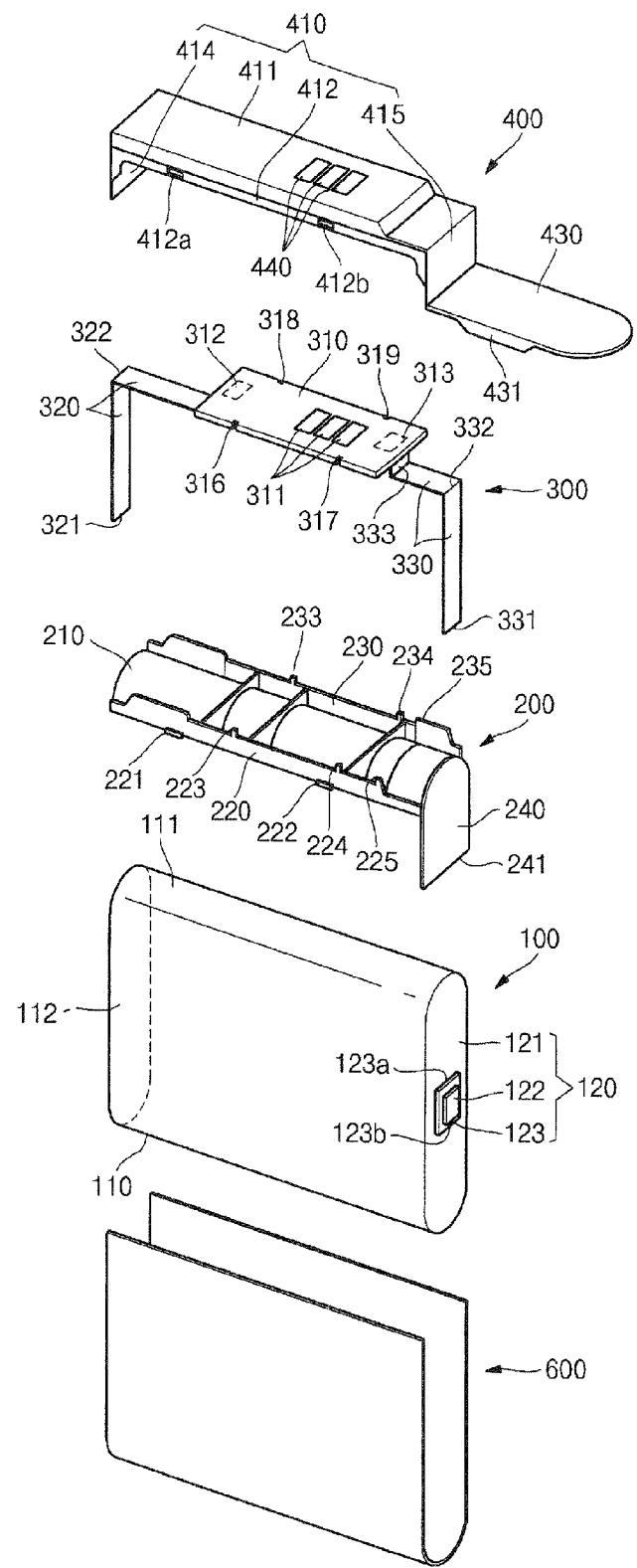
FIG. 1 is an exploded perspective view of a battery pack according to an embodiment of the present invention.

Battery packs according to preferred embodiments of the present invention will be described in more detail with reference to the accompanying drawings. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Often a battery pack has a protection circuit module that includes a protection circuit board having electrical components including IC circuits, charge-discharge switches and passive elements mounted thereon. The protection circuit module protects the bare cell from overcharge, overdischarge and overcurrent and prevents the battery pack from degrading in performance while controlling the bare cell.

Meanwhile, a battery pack is classified into a transverse-mounting type and a longitudinal-mounting type according to the location of protection circuit module mounted. Specifically, the transverse-mounting type battery pack is constructed such that a protection circuit module is mounted on a side surface of a bare cell. In the transverse-mounting type battery pack protection, in order to stably place and fix the protection circuit module, separate fixing members are provided on between side surfaces of the bare cell and the protection circuit module.

Additionally, in order to prevent short-circuit between a cap plate formed on the bare cell and an electrode terminal, a washer is provided on the cap plate.

If a washer provided on a cap plate is omitted for the purpose of simplifying the manufacturing process of a battery pack, a holder case constructed to prevent short-circuit between the cap plate and the electrode terminal would be required.

First, a battery pack according to an exemplary embodiment of the present invention will be described.

Figure 2:
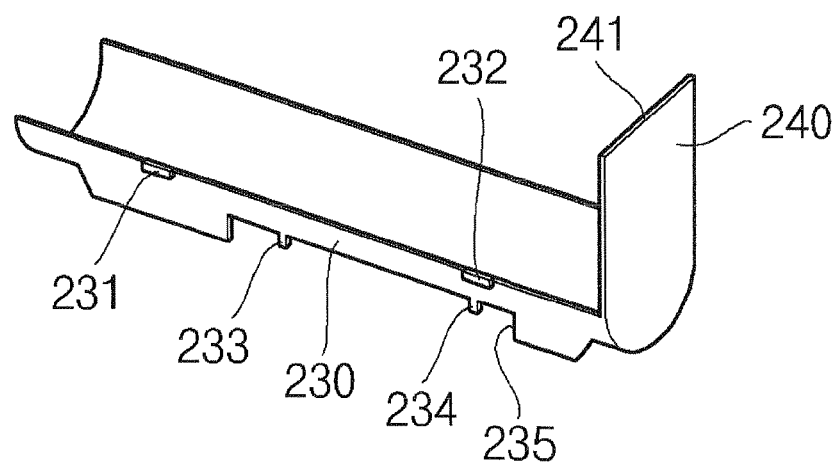
FIG. 2 is a perspective view of a second side surface and a bottom surface of a holder case shown in FIG. 1.
Figure 3:
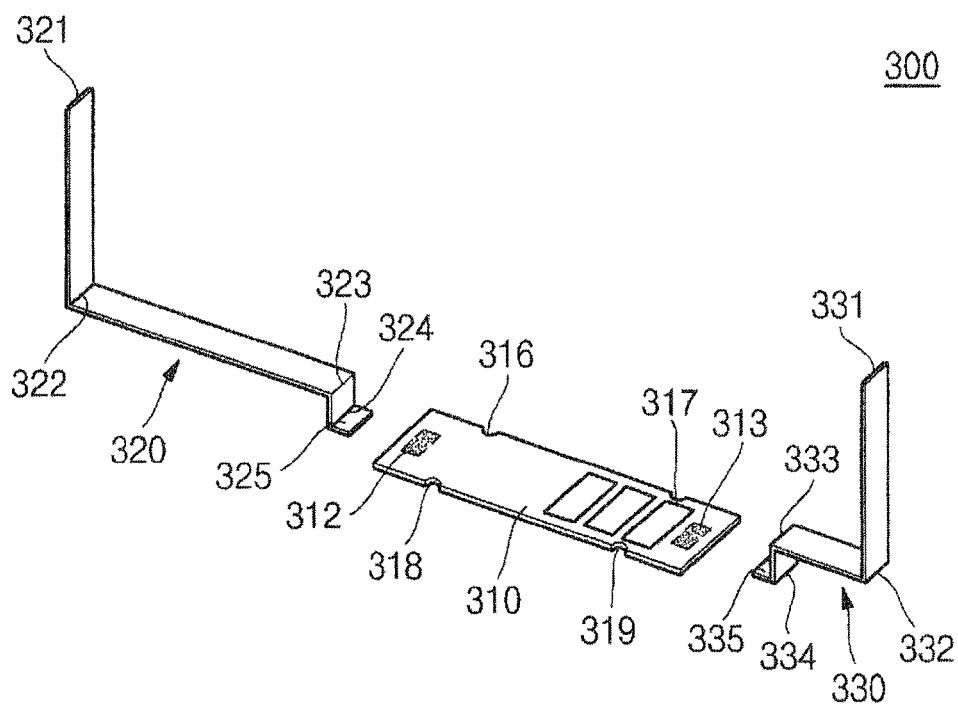
FIG. 3 is an exploded perspective view of a sectional view of a protection circuit module shown in FIG. 1.
Figure 4:
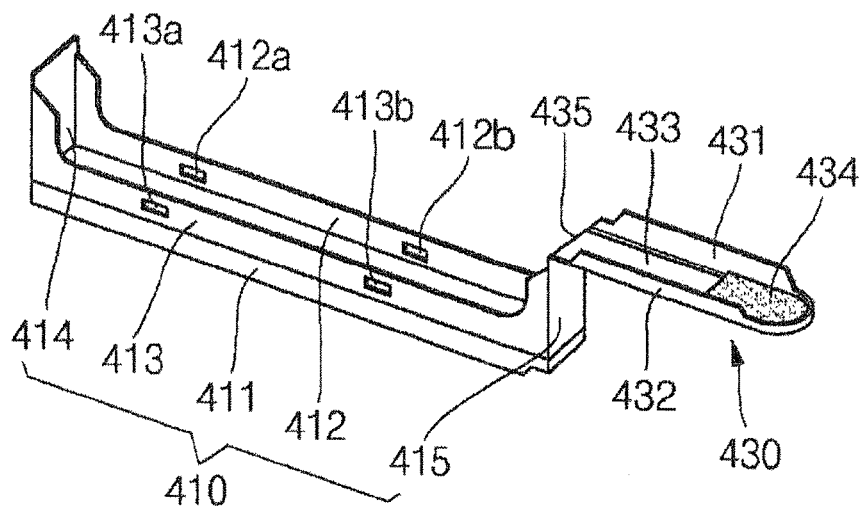
FIG. 4 is a perspective view of a second side surface and a bottom surface of a cover case shown in FIG. 1.

FIG. 1 is an exploded perspective view of a battery pack according to an embodiment of the present invention, FIG. 2 is a perspective view of a second side surface and a bottom surface of a holder case shown in FIG. 1, FIG. 3 is an exploded perspective view of a sectional view of a protection circuit module shown in FIG. 1, and FIG. 4 is a perspective view of a second side surface and a bottom surface of a cover case shown in FIG. 1.

Referring to FIGS. 1 through 4, the battery pack according to the illustrated embodiment of the present invention may include a bare cell 100, a holder case 200, a protection circuit module 300, and a cover case 400. In addition, the battery pack may further include a label 600.

The bare cell 100 may include a can 110 having an upper opening to receive an electrode assembly (not shown), and a cap assembly 120 combined with the electrode assembly accommodated in the can 110 to finish an upper opening of the can 110 for hermetically sealing.

Although not shown, the electrode assembly can be produced by winding a positive electrode plate, a negative electrode plate, and a separator into a jelly roll-type structure.

The can 110 may be made of a metal having substantially a rectangular parallelepiped shape having an upper opening, and can be formed using a deep drawing method, or the like. That is to say, the can 110 may be made of a light, conductive metal material, such as aluminum, or an aluminum alloy. Thus, the can 110 itself may serve as an electrode terminal. The can 110 is a container to receive an electrode assembly and an electrolyte.

The cap assembly 120 may include a metallic cap plate 121, the negative terminal 122 and an insulation gasket 123 electrically insulating the cap plate 121 and the negative terminal 122 from each other. Here, the cap plate 121 and the can 110 may be electrically connected to a positive electrode of the electrode assembly, and the negative terminal 122 is electrically connected to a negative electrode of the electrode assembly. In addition, the cap assembly 120 may further include an insulation plate (not shown) formed under the cap plate 121, a terminal plate (not shown) formed under the insulation plate, and an insulation case (not shown) formed under the terminal plate.

The holder case 200 may include a bottom portion 210 covering one side surface 111 of the can 110 forming the bare cell 100, an insulating portion 240 covering a portion of the cap plate 121, and first and second support portions 220 and 230 formed at one and the other long sides of the bottom portion 210. The first support portion 220 may include a first coupling protrusion 221 and a second coupling protrusion 222 to be coupled with the cover case 400. In addition, the first support portion 220 may further include a first fixing protrusion 223 and a second fixing protrusion 224 to be coupled with the protection circuit module 300.

The second support portion 230 may include a third coupling protrusion 231 and a fourth coupling protrusion 232 to be coupled with the cover case 400. In addition, the second support portion 230 may include a third fixing protrusion 233 and a fourth fixing protrusion 234 to be coupled with the protection circuit module 300.

The bottom portion 210 has a shape corresponding to the one side 111 of the can 110. The bottom portion 210 may be tightly fixed to the one side 111 of the can 110 forming the bare cell 100 by applying an adhesive or a double-sided tape to a bottom surface of the bottom portion 210.

The first support portion 220 supports the protection circuit module 300. In addition, the first coupling protrusion 221 and the second coupling protrusion 222 formed in the first support portion 220 are forcibly fitted into a first coupling hole 412a and a second coupling hole 412b formed in the cover case 400 to be described later in a forced fitting type, thereby fixing the cover case 400. In addition, the first fixing protrusion 223 and the second fixing protrusion 224 may be formed in the first support portion 220 are inserted into a first fixing groove 316 and a second fixing groove 317 formed in the protection circuit board 310 forming the protection circuit module 300 to be described later, thereby fixing the protection circuit module 300. In order to fix the protection circuit module 300 in a more secured manner, the first support portion 220 may further include a first locking stopper 225.

The second support portion 230 supports the protection circuit module 300. In addition, the third coupling protrusion 231 and the fourth coupling protrusion 232 formed in the second support portion 230 may be forcibly fitted into a third coupling hole 413a and a fourth coupling hole 413b formed in the cover case 400 to be described later in a forced fitting type, thereby fixing the cover case 400. In addition, the third fixing protrusion 233 and the fourth fixing protrusion 234 may be formed in the second support portion 230 are inserted into a third fixing groove 318 and a fourth fixing groove 319 formed in the protection circuit board 310 forming the protection circuit module 300 to be described later, thereby fixing the protection circuit module 300. In order to fix the protection circuit module 300 in a more secured manner, the second support portion 230 may further include a second locking stopper 235.

The insulating portion 240 may have a shape and a width corresponding to those of the cap plate 121 and may be tightly fixed to the cap plate 121 by applying an adhesive or a double-sided tape to its inner surface. The insulating portion 240 may be preferably formed such that an end 241 thereof reaches one side 123a of the insulation gasket 123 when it is fixed on the cap plate 121. The reason of the foregoing is to replace a washer provided on the cap plate 121 for the purpose of preventing short-circuit between the bare cell 100 and the protection circuit module 300 by the insulating portion 240. In addition, when the insulating portion 240 is fixed to the cap plate 121, a top surface of the insulating portion 240 and a top surface of the negative terminal 122 are preferably positioned at the same height. That is to say, a thickness of the insulating portion 240 is preferably equal to a height ranging from the top surface of the cap plate 121 to the top surface of the negative terminal 122. By doing so, the first lead plate 330 of the protection circuit module 300 to be described later can be coupled to the negative terminal 122 in a secured manner.

The protection circuit module 300 may include a protection circuit board 310 controlling charging and discharging, a first lead plate 330 electrically connecting the protection circuit board 310 and the negative terminal 122, and a second lead plate 320 may electrically connect the protection circuit board 310 and the bottom surface 112 of the can 110.

The protection circuit board 310 may include a charge-discharge terminal 311, a first welding pad 313 and a second welding pad 312. In addition, the protection circuit board 310 includes a first fixing groove 316, a second fixing groove 317, a third fixing groove 318, and a fourth fixing groove 319.

The protection circuit board 310 may be made of a polymer resin such as Bakelite or epoxy. A plurality of conductive metal patterns (not shown) may be printed on the bottom surface of the protection circuit board 310. Various elements (not shown) for controlling charging and discharging may be soldered to the metal patterns.

The charge-discharge terminal 311 may be formed on portions of a top surface corresponding to the bottom surface of the protection circuit board 310, on which the elements are mounted. In addition, the charge-discharge terminal 311 may be electrically connected to the conductive metal patterns. The charge-discharge terminal 311 serves a path electrically connecting the bare cell 100 and an external system (not shown).

The first fixing groove 316 and the second fixing groove 317 may be formed at one long side of the protection circuit board 310, and may be positioned at locations corresponding to the first fixing protrusion 223 and the second fixing protrusion 224 formed in the first support portion 220 of the holder case 200, respectively. In addition, the first fixing groove 316 and the second fixing groove 317 have shapes corresponding to those of the first fixing protrusion 223 and the second fixing protrusion 224. Therefore, the first and second fixing protrusions 223 and 224 may be inserted into the first and second fixing grooves 316 and 317, thereby preventing the protection circuit board 310 from moving on the holder case 200.

The third fixing groove 318 and the fourth fixing groove 319 may be formed at the other long side of the protection circuit board 310, and may be positioned at locations corresponding to the third fixing protrusion 233 and the fourth fixing protrusion 234 formed in the second support portion 230 of the holder case 200, respectively. In addition, the third fixing groove 318 and the fourth fixing groove 319 have shapes corresponding to those of the third fixing protrusion 233 and the fourth fixing protrusion 234. Therefore, the third fixing protrusion 233 and the fourth fixing protrusion 234 may be inserted into the third fixing groove 318 and the fourth fixing groove 319, thereby preventing the protection circuit board 310 from moving on the holder case 200.

In addition, the one short side of the protection circuit board 310 is locked by the first locking stopper 225 and the second locking stopper 235 formed on the first and second support portions 220 and 230 of the holder case 200, thereby preventing the protection circuit board 310 from moving in a more secured manner.

The first lead plate 330 electrically connects the protection circuit board 310 and the negative terminal 122. The first lead plate 330 may be shaped such that it is folded at an angle of 90 degrees at a first folding portion 332, a second folding portion 333 and a third folding portion 334, respectively. The first lead plate 330 may be connected to a first welding pad 313 formed in the protection circuit board 310 on a first welding surface 335 through welding. In addition, one side end 331 of the first lead plate 330 is connected to the negative terminal 122 by welding. In this case, the first lead plate 330 is preferably formed such that one side end 331 thereof does not pass of the other side end 123b of the insulation gasket 123. By doing so, the first fixing portion 430 of the cover case 400 to be described later can be coupled to the bare cell 100 in a secured manner while minimizing the volume of the battery pack.

The second lead plate 320 electrically connects the protection circuit board 310 and the bottom surface 112 of the can 110 serving as a positive terminal. The second lead plate 320 is shaped such that it is folded at an angle of 90 degrees at a fourth folding portion 322, a fifth folding portion 323, and a sixth folding portion 324, respectively. The second lead plate 320 is connected to a second welding pad 312 formed in the protection circuit board 310 on a second welding surface 325 through welding. In addition, one side end 321 of the second lead plate 320 is connected to the bottom surface 112 of the can 110.

The cover case 400 includes a cover portion 410 formed on the protection circuit module 300, and a first fixing portion 430 fixed to the bare cell 100 while covering a top surface of the bare cell 100.

The cover case 400 is a plastic case produced by integrally forming the cover portion 410 and the fixing portion 430 divided in view of a first connecting portion 435. The cover case 400 is an integrally formed case made of a resin material such as carbonate by injection-forming.

The cover portion 410 may include a top cover 411, a first side surface cover 412 formed at one long side of the top cover 411, a second side surface cover 413 formed at the other long side of the top cover 411, a third side surface cover 415 formed at one short side of the top cover 411, and a fourth side surface cover 414 at the other short side of the top cover 411.

The top cover 411 may include an external terminal 440 electrically connected to an external system. The external terminal 440 is formed at a location corresponding to the charge/discharge terminal 311 on the protection circuit board 310 to have a shape corresponding to that of the charge/discharge terminal 311. Therefore, electric current flowing from the bare cell 100 to the protection circuit module 300 is transmitted to the external terminal 440 through the charge/discharge terminal 311 and to the external system through the external terminal 440.

The first side surface cover 412 may include the first coupling hole 412a and the second coupling hole 412b at locations corresponding to the first coupling protrusion 221 and the second coupling protrusion 222 formed on the first support portion 220 of the holder case 200. The first coupling hole 412a and the second coupling hole 412b have sizes and shapes corresponding to those of the first and second coupling protrusions 221 and 222. Thus, the first coupling hole 412a and the second coupling hole 412b are forcibly fitted into the first coupling hole 412a and the second coupling hole 412b in a forced fitting type, thereby firmly fixing the cover case 400 to the holder case 200.

The second side surface cover 413 may include a third coupling hole 413a and a fourth coupling hole 413b at locations corresponding to the third coupling protrusion 231 and the fourth coupling protrusion 232 on the second support portion 230 of the holder case 200. The third coupling hole 413a and the fourth coupling hole 413b have sizes and shapes corresponding to those of the third and fourth coupling protrusions 231 and 232. Thus, the third coupling protrusion 231 and the fourth coupling protrusion 232 are forcibly fitted into the third coupling hole 413a and the fourth coupling hole 413b in a forced fitting type, thereby firmly fixing the cover case 400 to the holder case 200.

The third side surface cover 415 covers portions of the insulating portion 240 and the first lead plate 330 formed on the cap plate 121.

The fourth side surface cover 414 covers a portion of the second lead plate 320 formed on the bottom surface 112 of the can 110.

The first fixing portion 430 may include a first sealing portion 433 having a space for accommodating the insulating portion 240 and the first lead plate 330 while covering the insulating portion 240 and first lead plate 330, and a first adhering portion 434 attached and fixed to the cap plate 121. In addition, the first fixing portion 430 may further include a first extending portion 431 and a second extending portion 432, which can be attached thereto while partially covering side surfaces of the can 110.

The first fixing portion 430 may be fixed to the bare cell 100 while covering its top surface, thereby fixing the cover case 400 to the bare cell 100. In addition, the first fixing portion 430 electrically insulates the cap plate 121 disposed on the top surface of the bare cell 100 and the negative terminal 122 from the outside.

The first sealing portion 433 has a width corresponding to that of the cap plate 121. In addition, the first sealing portion 433 is formed have a stepped portion with respect to the first adhering portion 434. In more detail, the first adhering portion 434 is preferably positioned a sum of thicknesses of the first lead plate 330 and the insulating portion 240 higher than the first sealing portion 433. In addition, the boundary where the stepped portion is formed is preferably positioned at a location corresponding to the other side end 123b of the insulation gasket 123.

In this case, an empty space between the first fixing portion 430 and the top surface of the bare cell 100 is minimized, thereby minimizing the volume of the battery pack while firmly fixing the first fixing portion 430 to the bare cell 100.

The first adhering portion 434 has a size and a shape corresponding to those of an end of the cap plate 121, and may be formed to have a stepped portion with respect to the first sealing portion 433, as described above. The first adhering portion 434 allows the first fixing portion 430 to be adhered or fixed to the cap plate 121. To this end, an adhesive or a double-sided tape may be applied to a region between the first adhering portion 434 and the cap plate 121.

The first extending portion 431 and the second extending portion 432 may be formed at long sides of the first fixing portion 430, and cover portions of side surfaces of the bare cell 100 when the first fixing portion 430 is securely fixed to the top surface of the bare cell 100. The first extending portion 431 and the second extending portion 432 may be fixed to the side surfaces of the bare cell 100 by applying an adhesive or double-sided tape to inner surfaces of the bare cell 100. In this case, the first fixing portion 430 can be fixed to the bare cell 100 in a more securely manner.

The label 600 covers the bare cell 100. The label 600 serves to insulate the side circumference of the can 110. The label 600 may be adhered to the side circumference of the bare cell 100 by an adhesive. Information including capacity, serial number, and so on of a battery pack may be printed on the outer surface of the label 600.

As described above, the battery pack according to the embodiment of the present invention includes the holder case 200 having the insulating portion 240 having a simplified configuration, instead of a washer provided on the cap plate 121 of the bare cell 100, thereby simplifying the manufacturing process while reducing manufacturing costs.

In addition, the battery pack according to an exemplary embodiment of the present invention includes the cover case 400 securely adhered to an upper portion of the bare cell 100, thereby minimizing the volume of the battery pack and increasing a coupling force between the cover case 400 and the bare cell 100.

Figure 5:
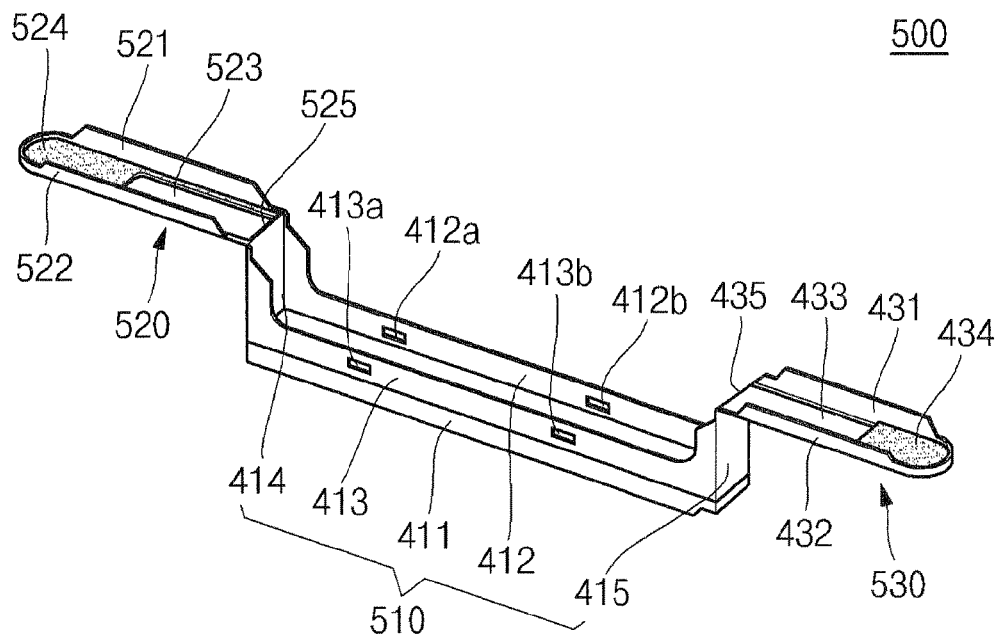
FIG. 5 is a perspective view of a second side surface and a bottom surface of a cover case in a battery pack according to another embodiment of the present invention.

A battery pack according to another exemplary embodiment of the present invention will now be described. FIG. 5 is a perspective view of a second side surface and a bottom surface of a cover case in a battery pack according to another embodiment of the present invention.

The battery pack according to the illustrated embodiment of the present invention is substantially the same as the battery pack according to the previous embodiment, except that a cover case 500 further includes a second fixing portion 520 divided in view of a second connecting portion 525. Thus, repetitive descriptions about the same functional components, except for the second fixing portion 520, will not be given. In the illustrated embodiment that follows, only the second fixing portion 520, a distinguished part from the previous embodiment will chiefly be described.

The battery pack according to the illustrated embodiment may include a bare cell 100, a holder case 200, a protection circuit module 300, and a cover case 500. The battery pack according to the illustrated embodiment may further include a label 600.

Referring to FIG. 5, the cover case 500 includes a cover portion 510 formed on an upper portion of the protection circuit module 300, a first fixing portion 530 fixed to the bare cell 100 while covering a top surface of the bare cell 100, and a second fixing portion 520 fixed to the can 110 while cover a bottom surface 112 of the can 110.

The second fixing portion 520 may include a second sealing portion 523 having a space for accommodating the second lead plate 320 while covering the second lead plate, and a second adhering portion 524 attached and fixed to a bottom surface 112 of the can 110. In addition, the second fixing portion 520 may further include a third extending portion 521 and a fourth extending portion 522 fixed to the can 110 while covering portions of side surfaces of the can 110.

The second fixing portion 520 may be fixed to the can 110 while covering the bottom surface 112 of the can 110, thereby allowing the cover case 400 to be fixed to the bare cell 100. In addition, the second fixing portion 520 electrically insulates the bottom surface 112 of the can 110 serving as a positive terminal and the second lead plate 320 from the outside.

The second sealing portion 523 has a width corresponding to that of the bottom surface 112 of the can 110. In addition, the second sealing portion 523 may be formed having a stepped portion with respect to a second adhering portion 524. In more detail, the second adhering portion 524 is preferably positioned a thickness of the second lead plate 320 higher than the second sealing portion 523. In addition, the boundaries where the stepped portion is formed is preferably positioned at a location corresponding to edges of the second lead plate 320. In this case, an empty space between the second fixing portion 520 and the bottom surface 112 of the can 110 is minimized, thereby minimizing the volume of the battery pack while firmly fixing the second fixing portion 520 to the bare cell 100.

The second adhering portion 524 has a size and a shape corresponding to those of a longitudinal end of the bottom surface 112 of the can 110, and may be formed to have a stepped portion with respect to the second sealing portion 523, as described above. The second adhering portion 524 allows the second fixing portion 520 to be adhered or fixed to the bottom surface 112 of the can 110. To this end, an adhesive or a double-sided tape may be applied to a region between the second adhering portion 524 and the bottom surface 112 of the can 110.

The third extending portion 521 and the fourth extending portion 522 may be formed at long sides of the second fixing portion 520, and cover portions of side surfaces of the bare cell 100 when the second fixing portion 520 is securely fixed to the bottom surface 112 of the can 110. The third extending portion 521 and the fourth extending portion 522 may be fixed to the side surfaces of the bare cell 100 by applying an adhesive or double-sided tape to inner surfaces of the bare cell 100. In this case, the second fixing portion 520 can be fixed to the bare cell 100 in a more securely manner.

As described above, the battery pack according to the illustrated exemplary embodiment of the present invention further includes the second fixing portion 520 provided in the cover case 500, instead of separately forming a lower case covering the bottom surface 112 of the can 110. Accordingly, since the use of a lower case is not required, the battery pack can simplify the manufacturing process while reducing manufacturing costs.

In addition, since the battery pack includes the cover case 500 securely adhered to the bottom surface 112 of the can 110, the volume of the battery pack can be minimized and a coupling force between the cover case 500 and the bare cell 100 can be increased.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a bare cell including an electrode assembly, a can accommodating the electrode assembly, and a cap assembly having a cap plate covering an upper opening of the can;
   a holder case including a bottom portion covering one side surface of the bare cell, first and second support portions respectively formed at first and second sides of the bottom portion, and an insulating portion, said insulating portion extends at a ninety degree angle from solely one side of said bottom portion, said insulating portion is affixed to and covers a portion of the cap plate and said insulating portion does not extend beyond where an insulation gasket is positioned on the cap plate;
   a protection circuit module coupled to an upper portion of the holder case; and
   a cover case fixed to said one side surface of the bare cell while covering the holder case and the protection circuit module.

2. The battery pack of claim 1, wherein first and second coupling protrusions are formed in the first support portion of the holder case, and third and fourth coupling protrusions are formed in the second support portion of the holder case.

3. The battery pack of claim 1, wherein a first and second fixing protrusions are formed in the first support portion, and a third and fourth fixing protrusions are formed in the second support portion.

4. The battery pack of claim 1, wherein the insulating portion is formed such that an end thereof reaches one side of the insulation gasket when the insulating portion is fixed on the cap plate.

5. The battery pack of claim 1, wherein a thickness of the insulating portion is equal to a height ranging from a top surface of the cap plate to a top surface of a negative terminal of said cap assembly.

6. The battery pack of claim 1, wherein the protection circuit module, comprises:
   a protection circuit board controlling charging and discharging of the bare cell;
   a first lead plate electrically connecting the protection circuit board and a negative terminal of the cap assembly; and
   a second lead plate electrically connecting the protection circuit board and a bottom surface of the can.

7. The battery pack of claim 6, wherein the protection circuit board further comprises:
   a first and second fixing grooves at locations corresponding to a first and second fixing protrusions formed in the first support portion, the first and second fixing grooves having sizes and shapes corresponding to those of the first and second fixing protrusions; and
   a third and fourth fixing grooves at locations corresponding to a third and fourth fixing protrusions formed in the second support portion, the third and fourth fixing grooves having sizes and shapes corresponding to those of the third and fourth fixing protrusions.

8. The battery pack of claim 6, wherein the first lead plate is formed such that one side end thereof does not pass of another side end of the insulation gasket.

9. The battery pack of claim 1, wherein the cover case includes a cover portion formed on the protection circuit module and a first fixing portion fixed on a top surface of the bare cell while covering at least a portion of the bare cell.

10. The battery pack of claim 9, wherein the first fixing portion further comprises:
    a first sealing portion forming a space for accommodating the insulating portion and a first lead plate while covering the insulating portion and the first lead plate, and a first adhering portion attached and fixed to the cap plate.

11. The battery pack of claim 10, wherein the first sealing portion has a width corresponding to that of the cap plate and is positioned to form a stepped portion in combination with the first adhering portion, said sealing portion having a height shorter than the first adhering portion.

12. The battery pack of claim 11, wherein a height of the stepped portion is equal to the sum of thicknesses of the first lead plate and the insulating portion.

13. The battery pack of claim 11, wherein a boundary where the stepped portion is formed is positioned at a location corresponding to an end of another side of the insulation gasket.

14. The battery pack of claim 9, wherein the cover case further includes a second fixing portion fixed on a bottom surface of the bare cell while covering at least a portion of the bottom surface of the bare cell.

15. The battery pack of claim 14, wherein the second fixing portion includes a second sealing portion forming a space for accommodating a second lead plate while covering the second lead plate, and a second adhering portion attached and fixed to the bottom surface of the bare cell.

16. The battery pack of claim 15, wherein the second sealing portion has a width corresponding to that of the bottom surface of the can and is formed lower than the second adhering portion to have a stepped portion with respect to the second adhering portion.

17. The battery pack of claim 16, wherein a height of the stepped portion is equal to the thickness of the second lead plate.

18. The battery pack of claim 16, wherein boundaries where the stepped portion is formed are positioned at a location corresponding to edges of the second lead plate.

19. The battery pack of claim 9, wherein the cover portion comprises:
    a top cover having two long sides and two short sides, each of said two long sides being longer than either of said short sides;
    a first side surface cover formed at one long side of said two long sides of the top cover;
    a second side surface cover formed at another long side of said two long sides of the top cover; and
    a third side surface cover formed at one short side of said two short sides of the top cover, and a fourth side surface cover at another short side of said two short sides of the top cover.

20. The battery pack of claim 19, wherein the first side surface cover further comprises:
    a first and second coupling holes at locations corresponding to a first and second coupling protrusions formed in the first support portion, the first and second coupling holes having sizes and shapes corresponding to those of the first and second coupling protrusions, and the second side surface cover includes a third and fourth coupling holes at locations corresponding to a third and fourth coupling protrusions formed in the second support portion, the third and fourth coupling holes having sizes and shapes corresponding to those of the third and fourth coupling protrusions.

* * * * *